United States Patent [19]

Boston et al.

[11] Patent Number: 4,812,628

[45] Date of Patent: * Mar. 14, 1989

[54] TRANSACTION SYSTEM WITH OFF-LINE RISK ASSESSMENT

[75] Inventors: Vincent Boston, San Mateo; Elvis W. Boggan, Concord; Einar L. Asbo, Mill Valley, all of Calif.

[73] Assignee: Visa International Service Association, San Mateo, Calif.

[*] Notice: The portion of the term of this patent subsequent to Mar. 29, 2005 has been disclaimed.

[21] Appl. No.: 31,390

[22] Filed: Mar. 27, 1987

Related U.S. Application Data

[63] Continuation-in-part of Ser. No. 730,309, May 2, 1985, Pat. No. 4,734,564.

[51] Int. Cl.$^4$ ............................................ G06K 5/00
[52] U.S. Cl. .................................. 235/380; 235/379; 364/408; 340/825.33
[58] Field of Search ............... 235/379, 380, 381, 382, 235/382.5, 492; 340/825.33, 825.35; 364/401, 406, 408

[56] References Cited

U.S. PATENT DOCUMENTS

| | | | |
|---|---|---|---|
| 3,604,900 | 9/1971 | Kalt | 235/492 |
| 3,941,977 | 3/1976 | Voss et al. | 235/379 |
| 3,949,191 | 4/1976 | Crowther et al. | 235/380 |
| 3,982,103 | 9/1976 | Goldman | 235/380 |
| 4,011,433 | 3/1977 | Tateisi et al. | 235/381 |
| 4,091,448 | 5/1978 | Clausing | 235/379 |
| 4,114,027 | 9/1978 | Slater et al. | 340/825.33 |
| 4,197,986 | 4/1980 | Nagata | 340/825.33 |
| 4,485,300 | 11/1984 | Peirce | 235/379 |
| 4,650,976 | 3/1987 | Hiraishi | 235/379 |

*Primary Examiner*—Patrick R. Salce
*Assistant Examiner*—Marc S. Hoff
*Attorney, Agent, or Firm*—Limbach, Limbach & Sutton

[57] ABSTRACT

The subject invention relates to a transaction system wherein the issuer of transaction cards can regulate the type of authorization requests transmitted from the point of transaction. The system includes a plurality of transaction cards, each of which are provided with risk assessment data associated with each cardholder. The system further includes a plurality of terminals, each terminal having the ability to read the information placed on the transaction cards. In operation, the risk assessment data is used to generate a pending transaction limit. The amount of the transaction is compared to the pending transaction limit by the terminal. If the transaction is approved, the terminal will issue an automatic, off-line authorization. If the transaction does not fall within the approval range, the terminal will function to transmit the transaction information to the issuer for evaluation. The issuer can then determine whether to authorize the transaction based on its own data base.

8 Claims, 2 Drawing Sheets

TRANSACTION SYSTEM WITH OFF-LINE RISK ASSESSMENT

This application is a continuation-in-part of copending application Ser. No. 730,309, filed May 2, 1985, now U.S. Pat. No. 4,734,564.

TECHNICAL FIELD

The subject invention relates to a transaction system wherein the issuer of a transaction card can regulate the costs of transmission of authorization requests. Specifically, the system permits an issuer to specify, for each cardholder, the type of transactions that may be authorized at a remote location. By this arrangement, the number of authorization requests which must be transmitted to a remote approval site is reduced, thereby reducing communications costs.

BACKGROUND OF THE INVENTION

In recent years, the use of transaction cards has substantially increased. In many cases, transaction cards are used as a substitute for cash when purchasing goods or services. These transaction cards may be in the form of credit cards where a record of the transaction is kept and later billed to the cardholder. In some more recent systems, the card holder will fund an account which is debited for the amount of the transaction directly. These latter type of accounts are known as "debit cards". The banking industry has also begun utilizing transaction cards enabling common banking functions to be performed without a teller, using an automatic terminal.

As the use of these transaction cards has increased, so have losses related to fraud. Cards which have been lost or stolen are frequently used to purchase goods or services without the approval of the rightful owner. In addition, many counterfeit cards have been produced for unauthorized purchases. The industry has responded with a number of approaches designed to reduce the losses associated with such fraudulent transactions.

One of the initial approaches in the transaction card industry was to periodically print and distribute lists of lost or stolen cards. When a card is presented for a transaction, the card number is checked against this list prior to approval of the transaction. Unfortunately, this approach is time-consuming and prone to error. More importantly, because the information is distributed periodically, this system will not detect the fraudulent use of a card, prior to the time it has been reported lost, stolen or counterfeited and thereafter listed in the bulletin.

Recently, there have been developed various automatic "on-line" verification systems. In these systems, information about the cardholder and the transaction is transmitted via a communication link to a central control center for approval or further routing. In some cases, the central control center will be supplied with information about the cardholder and can make an approval decision. In some smaller transaction systems, the central station will be equivalent to the issuer of the card. In larger systems, where there are many card issuers, the transaction information may have to be routed from the central station to one of the outlying issuers for final approval.

When the first automatic systems were developed, the transaction information was typically entered into the approval network by the merchant, by telephoning a local operator who would enter the data in a terminal. More recently, numerous electronic terminals have been designed that automate the process. These terminals, which are placed at the merchant locations, are designed to receive the transaction information directly.

The terminals are provided with a means for reading the transaction card. For example, many transaction cards are provided with a magnetic stripe that is encoded with information, such as the account number of the cardholder and the institution which issued the card. These terminals will have a magnetic transducer for reading this information. The terminal will transmit the data on the magnetic stripe, along with other particulars of the transaction, such as the transaction amount, into the authorization system. The approval steps will then be taken, as outlined above.

As can be appreciated, where the issuer of the transaction card is remote from the point of transaction, significant communication costs can be incurred for each approval. In addition, the approvals are time-consuming and slow down the sales process. While the electronic approval process is suitable from the standpoint of reducing fraud, it would be desirable to balance the risk of fraud with the cost of approving every transaction.

One approach for reducing the costs of communication in an approval network is disclosed in U.S. Pat. No. 4,485,300, issued Nov. 27, 1984 to Peirce. The invention therein is directed toward a large transaction card system with multiple issuers of cards and a central data communication center. Prior to the invention disclosed therein, each transaction was routed by the control center to the respective issuers for approval. In order to reduce the need for the latter step, an approach was provided wherein various parameters were supplied to the control center. These parameters would define the type of transaction which could be approved directly by the control center, rather than transmitting the authorization request to the issuer.

These parameters are based on the general type of cardholder accounts of the issuer. For example, if the issuing institution has a small group of highly credit worthy customers, it can afford to set the transaction parameters relatively high. In this case, only higher dollar amount transactions need be referred back to the issuer for approval. In contrast, where an issuer has a large number of customers that represent high risk, the parameters would be set relatively low, to minimize the potential for credit and fraud losses. In the latter case, communications costs would be higher, however, these would presumably be offset by a reduction in losses. As can be seen, the issuer is able to make the decision based on its own needs.

The above described system has proved very successful in enabling an issuer to balance its communication costs with its credit and fraud losses. However, the latter approach still requires communication of the transaction parameters from the merchant to the central control station where the decision-making process is carried out. In addition, the parameters supplied to the data control center are based on a general evaluation of the cardholders of the issuer. Stated differently, these parameters are not keyed to the credit worthiness of each individual cardholder, but only represent an overall evaluation.

Based on the above, it would be desirable to provide a system where various transactions can be approved at the site of the transaction without incurring any communication costs. The decision should be under the control of the issuer and preferably based upon the credit worthiness of each individual cardholder.

Accordingly, it is an object of the subject invention to provide a new and improved system wherein the issuer can regulate the type of authorization requests, transmitted from the point of transaction.

It is another object of the subject invention to provide a new and improved system wherein an approval of a transaction can be generated off-line, at a remote terminal, based on criteria supplied by the issuer of the transaction card.

It is a further object of the subject invention to provide a new and improved system wherein issuers of cards can encode information on a transaction card to permit the evaluation of each transaction at a remote terminal.

It is another object of the subject invention to provide an approval system where communication costs are substantially reduced.

SUMMARY OF THE INVENTION

In accordance with these and many other objects, the subject invention provides for a transaction system where the issuer of a transaction card can regulate the type of authorization requests which are transmitted from the point of transaction. In this system, a file means is generated containing cardholder information. This file is maintained at a point remote from the point of transaction, such as at the issuer location. A subset of this information ca also be located at a data control center, in the manner described in the above-cited U.S. Pat. No 4,485,300.

In accordance with the subject invention, each transaction card is provided with data identifying the cardholder as well as data representative of risk assessment information associated with that specific cardholder. The risk assessment information is intended to provide an evaluation of the potential credit worthiness or in more general terms, the potential liability associated with that cardholder. For example, if the cardholder has a history of losing his cards, a greater risk would be associated with that account. Similarly, a history of exceeding credit limits would be considered in computing the risk assessment information. In contrast, if the cardholder has a high credit limit and no history of past difficulties, the risk assessment information would be designed to reflect that status.

This risk assessment information can be encoded onto the magnetic stripe of the transaction card. The information can be cryptographically encoded so that it cannot be read by unauthorized users. As can be appreciated, transaction cards are being developed which do not utilize a magnetic stripe to store cardholder information. For example, various "smart cards" have been developed where the information is held in a computer memory in a card. The subject invention is intended to cover these types of transaction cards and any others where the risk assessment information, which is supplied by the issuer, is placed on the card in a manner to be readable by the transaction terminal.

The subject invention further includes a terminal which is located at the point of transaction and, as stated above, includes a means for reading the data carried on the transaction card. The terminal includes a processor means for evaluating the transaction based on the risk assessment information carried on the card. If the particular transaction falls within the parameters set by the issuer, the terminal itself can issue an approval. If, however, the transaction falls without the bounds set by the issuer, the authorization request will then be sent on to the communication network for approval at a site remote from the transaction. As discussed above, this approval may take place at a control center or at the issuer of the transaction card.

In one embodiment of the subject invention, each transaction terminal will be provided with a single transaction dollar limit. In this embodiment, the risk assessment information carried on the card will take the form of a multiplier to be used in evaluating the transaction. Specifically, the multiplier on the card will be used to modify the dollar limit in the terminal, to arrive at an amount, above which the transaction would be transmitted for approval.

In an alternate embodiment of the subject invention, the terminal is provided with information representative of a plurality of transaction dollar limits. In one case, a set of actual dollar limits are stored in the terminal. Alternatively, a single dollar limit can be stored in conjunction with a plurality of multipliers used for calculating the dollar limit. In the second embodiment of the subject invention, the risk assessment information on the transaction cards will take the form of an indicator or address. The indicator read from the card is used by the terminal to select from its memory (or to calculate) a transaction dollar limit applicable to the pending transaction. This approach allows the issuer to assign a level of quality to its cardholders while also allowing the terminal distributor (usually a merchant financial institution) to have more control over the approval process.

Further objects and advantages of the subject invention will become apparent from the following detailed description taken in conjunction with the drawings in which:

DETAILED DESCRIPTION OF THE PREFERRED EMBODIMENTS

Figure 1:
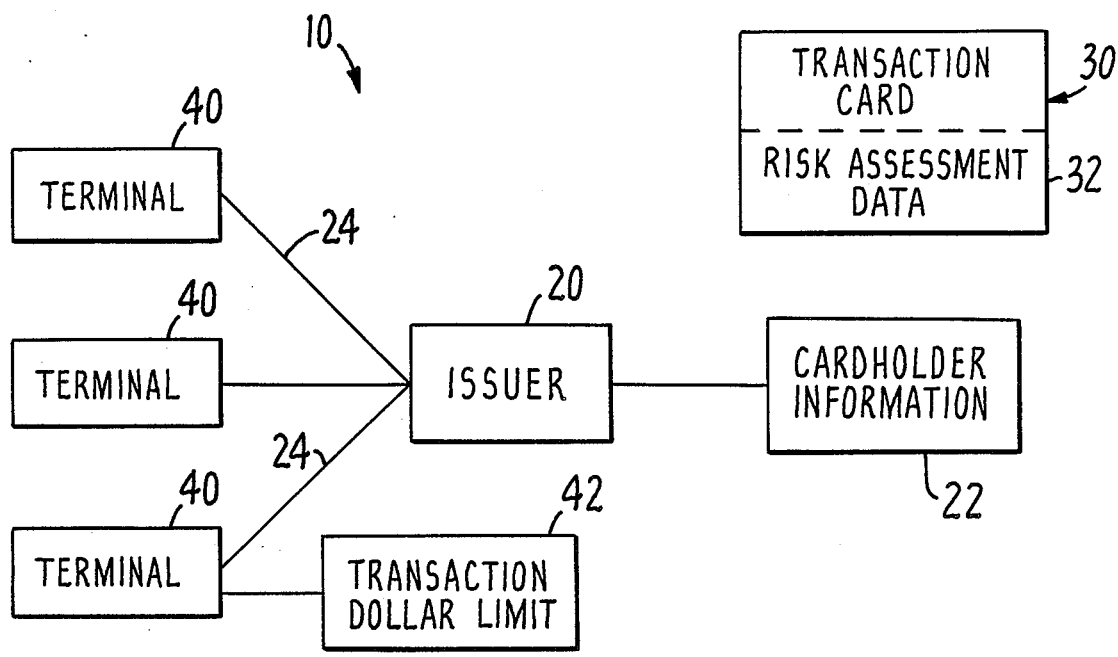
FIG. 1 is a block diagram illustrating one embodiment of the new and improved transaction system of the subject invention.

Turning now to FIG. 1, there is illustrated, in block form, the basic elements of the first embodiment of the transaction system 10 of the subject invention. In this system, an organization, denoted as the "issuer" 20, distributes transaction cards 30 to a number of customers. The issuer 20 may be a bank or other financial institution. Often, the issuer will collect information from the cardholder to make an evaluation and assign a credit limit to the cardholder. This credit limit, along with associated cardholder identification information is stored in a memory 22 located at the issuer. This information can be used to determine whether a particular transaction should be approved.

There are a number of different types of transaction cards now in use but by far the most prevalent in the United States is a plastic card having raised embossments thereon. In addition, the card is provided with a magnetic stripe which can be encoded with various account information. The parameters for these cards have been standardized. For example, the dimensions of the card are specified in ISO Document ISO/TC97/SC17/WG4-N95. The format for an encoded magnetic stripe is also standardized and can be found in ISO Standards 3554 and 4909.

The type of card and the method of assigning data thereto is not critical to the subject invention. For example, it is possible to utilize the newer type of smart cards wherein information related to the cardholder is stored in an internal memory, rather than on an magnetic stripe. In the subject invention, it is only necessary that transaction cards be capable of carrying data representative of the risk assessment associated with the cardholder.

In the basic embodiment of the subject invention, the issuer is connected via communication lines 24 to a plurality of transaction terminals 40. The terminals 40 are located at the point of the transaction. These transaction terminals are typically located at merchant locations where sales or services are being sought. However, they may also be available in banks or airports, where cash or traveller's checks are being dispensed.

The transaction terminal 40 of the subject invention has many elements similar to the automatic transaction terminals presently available. More specifically, the present point-of-transaction terminals have a means for reading the information encoded on the cards. Typically, the means includes a transducer for reading the information encoded on the magnetic stripe. Alternatively, the terminal could have contacts for interfacing with the mechanical contacts of a smart card. The terminal will also have a processor for controlling operation such as basic formatting steps, dialing and transmission of the information to the issuer. Typically, the terminal will also have a keypad input for receiving additional information relating to the transaction, such as the transaction amount.

In accordance with the subject invention, the processor in the terminal will be programmed to provide a comparison function for evaluating the transaction based upon risk assessment information placed on the card. This comparison function will be discussed below. A terminal having suitable electronics to perform all of the functions disclosed herein is manufactured by INTERNATIONAL VERIFACT, INC., Terminus Model. The latter terminal, which operates with an Intel 80C31 microprocessor, is designed to perform many transaction functions. This terminal could be readily modified to perform the functions disclosed herein by adding software instructions. The terminal may also be adjusted to read information encoded on a different track of the magnetic stripe where the risk assessment information can be placed. Additional hardware can be supplied to permit the detection of various secure card properties such as Watermark Magnetics, if other security features are desired.

In operation of the prior art system outlined above, a cardholder would present his card 30 to a merchant. The merchant would run the card through the terminal enabling the terminal to read the information on the card. The merchant would then enter the transaction amount and this information would then be transmitted along communications line 24 to the issuer. The issuer would compare the information sent by the terminal with the cardholder information stored in memory 22. If the evaluation was favorable, an approval code would be sent back to the merchant, who would complete the transaction. If the evaluation was unfavorable, the transaction would be declined. As can be appreciated, this approach was time-consuming and required significant communication costs.

In the prior art, some of the communication costs were reduced by providing a minimum or floor limit in the terminals. More specifically, the terminal could be programmed in a simple manner to automatically approve any transaction which fell below a certain dollar limit. This approach was geared to an evaluation of the merchant. Specifically, if the merchant was reputable, the type of transactions which would be automatically approved could be set at a relatively high level.

Unfortunately, this approach would not allow for any control based on an evaluation of the cardholder. Furthermore, and as discussed below, in larger systems, the dollar amount is controlled by a "merchant member," rather than the issuer. Accordingly, it would be desirable to allow the issuer of the card to control the costs of communication and to control its risk of loss.

To satisfy these objectives, each transaction card is provided with data representative of risk assessment information 32. This risk assessment data may been coded on a magnetic stripe on the card. As noted above, this information can also be stored in a card memory or provided in any other suitable fashion.

The risk assessment data 32 is designed to define the potential liability of the cardholder. Thus, a customer having a good credit rating would be afforded a fairly high assessment value. In contrast, a cardholder having a poor credit history would be supplied with a lower assessment value. Each issuer could make its decision based on the histories of its own individual cardholders.

In accordance with the subject invention, the processor in the terminal would have the capability of reading the risk assessment information on the card and comparing this information to the transaction amount. This information is compared to determine if an approval can be granted without communicating with the issuer. If the evaluation is favorable, the terminal will generate an approval "off-line." If the evaluation falls beyond the limits recorded on the card, an authorization request would be sent along communications lines 24 to the issuer 20.

In the preferred embodiment, the terminal is provided with a transaction dollar limit 42. This value will be stored in the memory of the processor of the terminal. The amount of the transaction dollar limit will be, in part, a function of the potential liability of the merchant or the particular location where the terminal is placed. In this case, the risk assessment data on the card will be defined by a multiplier which is used to increase (or reduce) the transaction dollar limit stored in the terminal.

For example, the issuer may assign a risk assessment value of "2" to the cardholder. The terminal 140, after reading the card, will multiply this value times the transaction dollar limit stored in the terminal. Thus, if the transaction dollar limit is 50 dollars, the result of the multiplication would be 100 dollars. If the amount of the transaction in progress was less than 100 dollars, an automatic approval would be generated. If the transaction amount exceeded 100 dollars, the authorization request would be routed to the issuer. The value of the multiplier can be selected to be less than one thereby reducing the value stored in the terminal. The value of the multiplier could also be set to zero so that all transactions, for that cardholder, are sent to the issuer for authorization.

As can be appreciated, the subject system allows the issuer to have control over which requests are transmitted. In a system where the issuer is charged for such communication requests, costs can be balanced against the possibility of credit and fraud losses.

To further enhance security, it is desirable to assign a secret code or personal identification number(PIN) to each card. During a transaction, the cardholder would be required to enter his PIN, in order to secure an approval to the transaction. Such secret code systems are well-known in the prior art. Typically, the issuer will store a list of the secret numbers in memory 32 for use when the PIN is to be verified.

As can be appreciated, since the subject invention provides for remote, off-line authorization, a PIN approach must be selected which permits authorization of the PIN in the terminal. This requirement can be satisfied by placing a portion of the personal identification number (partial PIN) on the card. This partial PIN can then be compared with the full PIN entered at the terminal. Of course, if the authorization request is sent back to the issuer, the full PIN, entered by the user, can be checked with the full PIN stored at the issuer. The details of implementing one type of partial PIN validation system can be found in the Interbank Card Association PIN Manual at Page 56. If the PINs are to be encrypted, an off-line cryptographic key management system would be necessary. In the preferred embodiment of the subject invention, risk assessment information and a partial PIN are both encoded onto the card.

Figure 2:
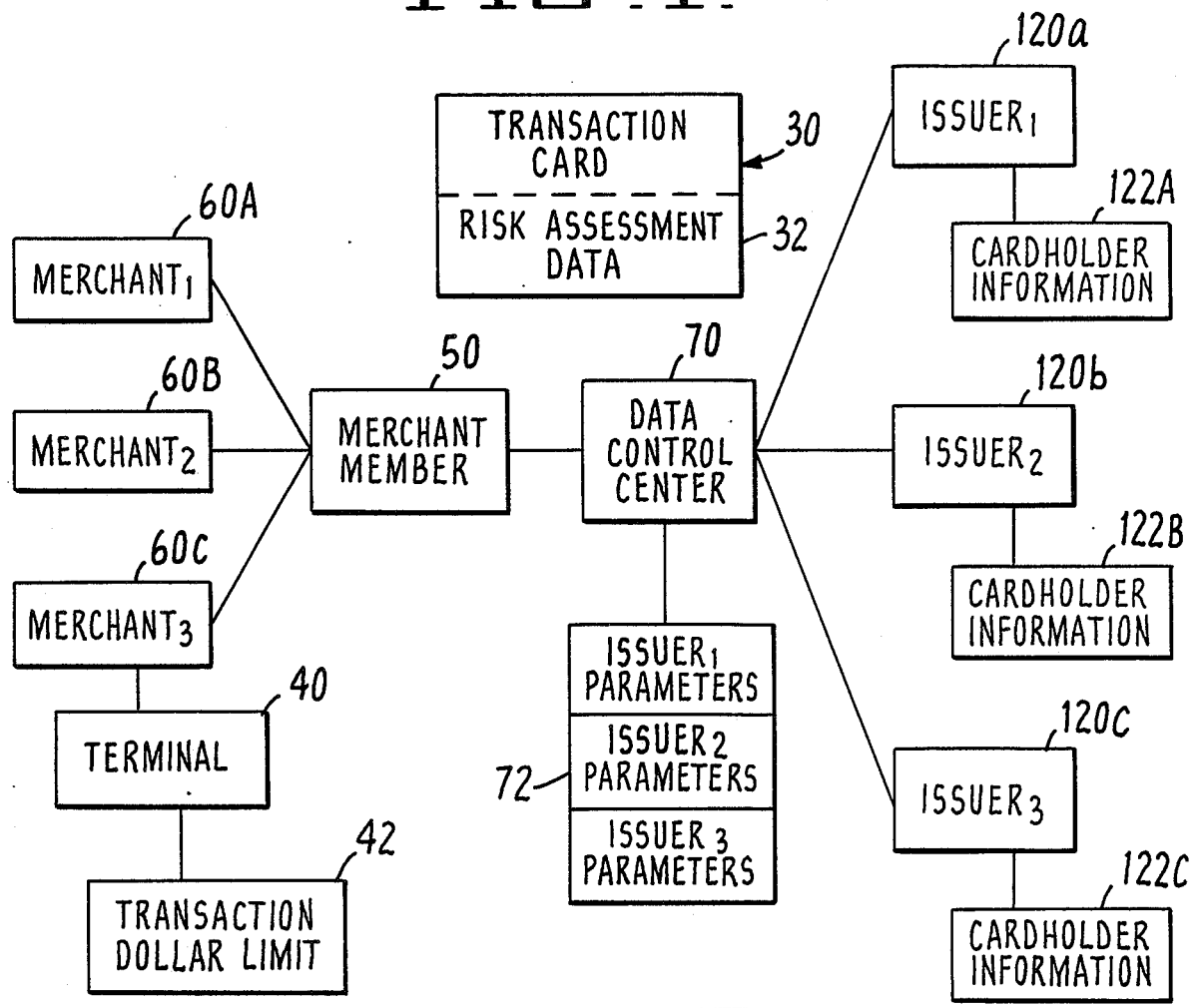
FIG. 2 is a block diagram illustrating the arrangement typically encountered in a large transaction card system.

Turning now to FIG. 2, there is illustrated a full scale transaction card system. While the subject system will find use in the simplified schematic shown in FIG. 1, its savings will be most significant in a larger system where communication costs are greatly increased. For example, the full scale system shown in FIG. 2 is implemented nationwide and, at the present time, is expanding rapidly into overseas markets.

As illustrated in FIG. 2, a large scale system will include a number of issuers 120A, B and C. Each issuer will distribute cards to its own cardholders. Thus, in this example, each issuer will maintain files 122A, B and C, respectively, for storing cardholder information. The cards of each of the issuers will include data identifying the cardholder, the issuing institution, and the risk assessment data.

In the system shown in FIG. 2, there will generally be a number of "merchant members." For clarity, only one merchant member 50 is shown. Typically, a merchant member 50 will be another financial institution which is responsible for signing up various merchants. Many issuers play the dual role of a merchant member. The illustration is shown to indicate that an issuer and the majority of its cardholders can be located in New York, while the merchant member and its associated merchants are located in California.

Each merchant member 50 would sign up or recruit a number of merchants 60A, B and C. Each merchant 60 would be provided with one or more terminals 40 of the type discussed above with reference to FIG. 1. When the merchant 60 is signed up, the merchant member 50 would determine the potential for fraudulent transactions. Based on this evaluation, the terminal supplied to the merchant would be provided with a transaction dollar limit 42 designed to strike a compromise between communication costs and the potential for loss. Such a transaction dollar limit can be periodically updated depending upon the performance of the merchant 60.

In the illustrated embodiment, a data control center 70 is shown. The data control center acts as a network switch for routing transaction information. In a typical prior transaction, the cardholder data and transaction amount would be entered by the merchant at the merchant location. This information would be routed to the merchant member 50. If the merchant member and the issuer of the card were identical, the transaction could be approved at that location. However, the issuer and the merchant are typically not the same and the transaction information is then supplied to the data control center 70. In this situation, the data control center will determine the identity of the issuer of the card. The transaction information is then supplied to the proper issuer 120 for comparison with its own cardholder information 122. As discussed above, the issuer will make a determination whether to approve the transaction and return the response to the merchant.

As can be appreciated, the above approach can result in extremely high communication costs. One method for reducing this cost is disclosed in U.S. Pat. No. 4,485,300. In this patent, each issuer supplies the data control center 70 with issuer parameters 72. These parameters are based on the general cardholder performance for that issuer. Thus, if the issuer has relatively credit worthy customers, the parameters can be set at high level, enabling the data control center to issue a number of automatic approvals. While this approach is successful in reducing costs, it will be apparent that the subject invention has additional advantages. Specifically, many transactions will be approved right at the merchant location, without ever having to be communicate with the data control center. Furthermore, the risk assessment information can be tailored directly to the individual cardholders.

The operation of the subject invention as shown in FIG. 2 is essentially the same as that in FIG. 1. More specifically, when a customer presents his card to the merchant, the risk assessment data 32 carried thereon is read by a terminal 40. The merchant will also enter the transaction amount. In the preferred embodiment, the processor will function to multiply the risk assessment value on the card times the transaction dollar amount 42 stored in the terminal. The transaction amount will then be compared to determine if the transaction can be approved without transmission beyond the terminal. If the transaction is approved, the terminal will issue the approval directly. If the transaction is not approved, it will be sent through the system for subsequent evaluation.

In the preferred embodiment, the processor in the terminal can be programmed to add additional security features. For example, a random selector in the processor can be used to automatically designate certain transactions for transmission, no matter what was the result of the evaluation. In this manner, a fraudulent user who carefully selects transactions that fall below an estimated level would be periodically checked.

Another feature would be to include a geographical evaluation. More specifically, if the terminal determines that the issuer is located in a geographically close region, it can automatically route a higher percentage of those transactions thereto since communication costs are low. If, however, the terminal determines that the issuer is at a remote location, a different dollar amount can be utilized to reduce long distance communication.

Figure 3:
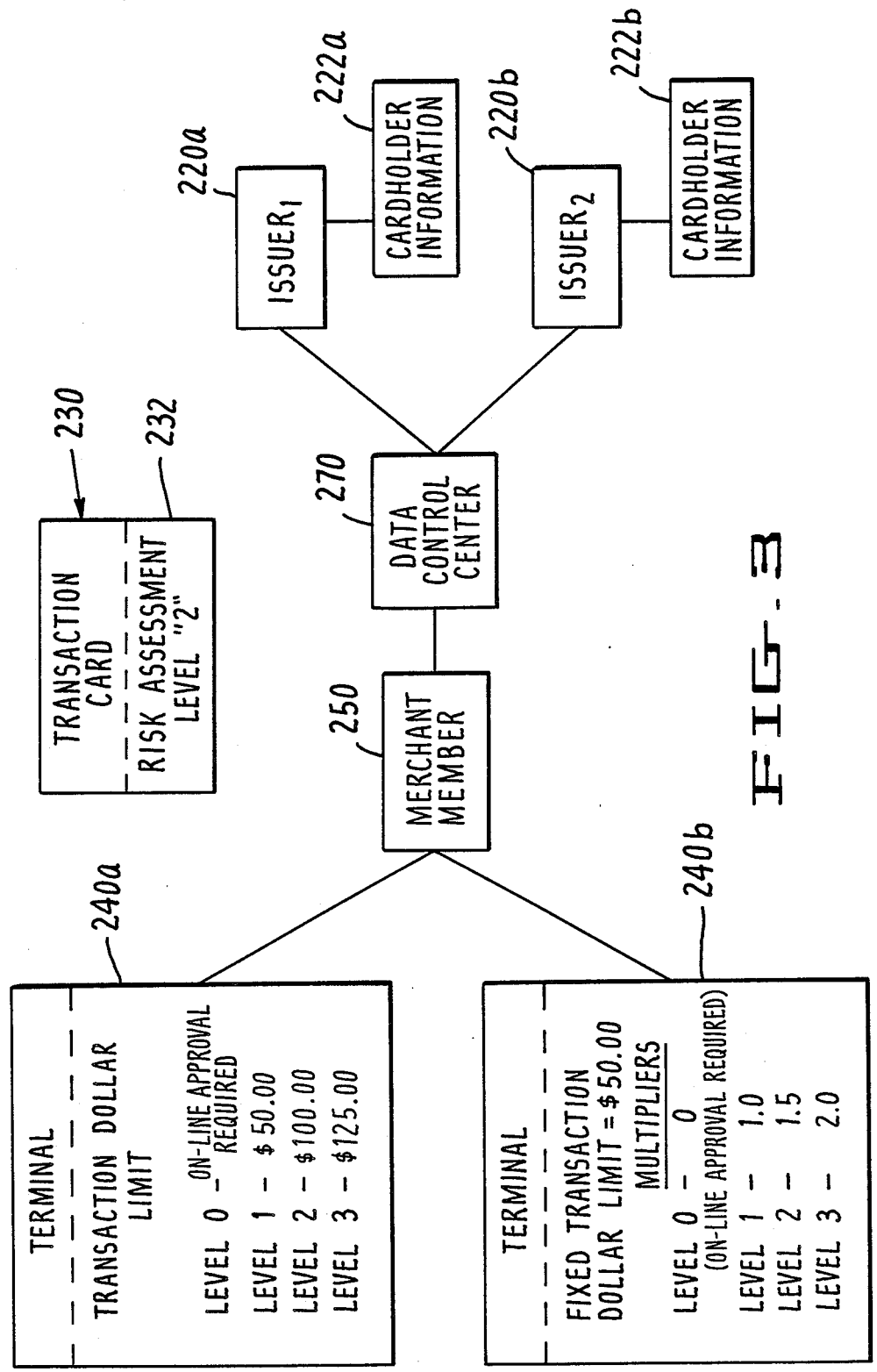
FIG. 3 is a block diagram illustrating an alternate embodiment of the transaction system of the subject invention.

Referring now to FIG. 3, there is illustrated an alternate embodiment of the subject invention. This embodiment is designed to allow flexibility for both the card issuers and the distributors of the terminal, typically the merchant members. This flexibility is achieved by storing information representative of a plurality of different transaction dollar limits in each terminal. As noted above, in the prior art, each terminal was typically provided with a single transaction dollar limit. If a given transaction exceeded this limit, the transaction information had to be routed to the issuer or central processor for further authorization. The terminals described herein operate in a similar manner except that the choice of a particular transaction dollar limit for the pending transaction is not fixed, but rather, is dependent upon the risk assessment data placed on the card.

In this alternate approach, each issuer 220 will distribute transaction cards 230 having risk assessment data encoded thereon. Similar to the first embodiment, the risk assessment data is based directly on the cardholder information 222 stored at the issuer. In this case, the risk assessment data 232 placed o the card will consist of a number, corresponding to one of a plurality of risk levels.

In the illustrated embodiment, card 230 is provided with a risk level of "2". A risk level of "1" can be used to represent a cardholder of average credibility, while risk levels of "2" or "3" could correspond to increasingly higher levels of credibility. As will be appreciated from the explanation below, these levels are not used as numerical multipliers (as in the first embodiment), and therefore the assignment of a number to a certain level of credibility is entirely arbitrary. A risk level of "0" can be used to indicate the lowest level of credibility where the issuer desires that all of the transactions of the cardholder be approved in an on-line manner.

Similar to the network described above, this system will typically be implemented where there are a plurality of issuers 220 connected to a data control center 270. A number of merchant members 250 (only one of which is shown in FIG. 3) are also connected to the data control center 270. The merchant member will be responsible for contracting with various merchants to accept the transaction cards. The merchant member will also supply the transaction terminals 240, either directly or indirectly, to its contracting merchants.

Two types of terminals 240 are illustrated in FIG. 3. Both of these terminals function in the same manner as the terminals described above except for the differences noted herein. In accordance with this embodiment of the subject invention, both of the terminals 240 have a means for storing information representative of a plurality of transaction dollar limits.

In the first version of this terminal 240a, a plurality of actual transaction dollar limits are stored. As seen in FIG. 3, limits of 50, 100 and 125 dollars are stored. Each of these limits are associated with one of the risk levels that might be found on a transaction card 230. In addition, a risk level of "0" is provided to insure that for certain cards, all transactions will be approved on-line.

To carry out a transaction, the terminal must read all the transaction information, including the risk assessment data, encoded on the card. The operator will also enter the transaction amount into the terminal.

The terminal will initially determine the transaction dollar limit for the pending transaction. In the illustrated embodiment, where a risk level of "2" is encoded on the card, the pending transaction dollar limit will be set to 100 dollars (corresponding to level "2" - in the terminal). If the entered transaction amount does not exceed the pending limit, the transaction can be approved off-line. Alternatively, if the amount exceeds the limit, the transaction information will be routed to the data control center 270 for further processing.

It should be noted that it is unnecessary for the dollar amounts in the terminal to bear any mathematical relationship to the numbers used to represent the risk levels. For example, a merchant member 250 may decide that for a particular merchant 260, all transactions over 50 dollars must get further approval. In this case, all three levels will be set to 50 dollars.

Terminal 240b is similar to terminal 240a in that it has information stored representative of a plurality of transaction dollar limits. In this case, however, only one actual dollar limits is stored. The variation in levels is achieved by storing a multiplier associated with each different risk level. In the illustrated example, multipliers of 1, 1.5 and 2.0 are stored for risk levels 1, 2 and 3 respectively. A multiplier of zero is associated with risk level zero.

In use, the pending transaction limit will be calculated my multiplying one of the multipliers times the fixed transaction dollar limit. The multiplier selected by the terminal will be based on the risk assessment data read from the card. In this example, where the risk level on the card is a "2", the level "2" multiplier (1.5) will be used to generate a pending transaction dollar limit of 75 dollars. (i.e. $1.5 \times \$50.00 = \$75.00$) As with terminal 240a, the decision whether to approve the transaction either in an on-line or off-line manner will be based on whether the transaction amount exceeds the pending (in this case, calculated) transaction limit.

It should be noted that in the alternate embodiment illustrated in FIG. 3, one type of transaction card will operate with either type of transaction terminal 240a or 24b. More specifically, both terminals expect to receive a risk assessment level from the card. This risk assessment level will enable the terminal to assign a transaction dollar limit for that transaction. In terminal 240a, this limit is simply read from a table. In terminal 240b, this limit is calculated by multiplying a multiplier (selected based on the risk assessment level on the card) with a fixed transaction limit in the terminal.

In summary, there has been provided a new and improved approach for a transaction system. In this approach, the issuer of transaction cards can control communication costs based on its own assessment of its cardholders. In this system, each transaction card is provided with risk assessment information supplied by the issuer. The terminal is provided with a means for evaluating this information in comparison with the present transaction. If the evaluation is favorable, the transaction can be approved at the terminal. If the transaction is not favorable, the terminal will forward the transaction information to the issuer for approval.

While the subject invention has been defined with reference to preferred embodiments, it should be understood that various other changes and modifications could be made therein, by one skilled in the art, without varying from the scope and spirit of the subject invention as defined by the appended claims.

I claim:

1. A system wherein an issuer of transaction cards can regulate the type of authorization requests associated with a transaction that are transmitted from the point of transaction, said system comprising:

processor means maintained at a location remote from the point of transaction, said processor means including a file means containing cardholder information, supplied by the issuer, for evaluating a transaction;

a transaction card carrying data identifying the cardholder, said card further including data, supplied by the issuer and representative of risk assessment information associated with the cardholder; and terminal means located at the point of transaction and connectable to said remote processor means, said terminal means having a means for reading the data carried on said card and a means for entering the amount of a transaction, said terminal means further including a means for storing information representative of a plurality of transaction limits, said terminal means further including a local processor means for evaluating a transaction based on the transaction amount and the risk assessment information carried on said card, and wherein said risk, assessment information on the card is used to select a transaction limit for the pending transaction, with said terminal means functioning to generate an approval code if the transaction amount does not exceed the pending transaction limit and if the amount does exceed that limit, said terminal means will connect to said remote processor means and forward the transaction information to said remote processor means for evaluation.

2. A system as recited in claim 1 wherein said terminal stores a plurality of actual transaction limits with the risk assessment information on the card being used to select an actual transaction limit in the terminal for the pending transaction.

3. A system as recited in claim 1 wherein said terminal stores a single transaction limit and a plurality of multipliers, with said risk assessment information the card being used to select the multiplier in the terminal for calculating the pending limit.

4. A system as recited in claim 1 wherein the risk assessment information on said card includes a code indicating that the transaction information for each transaction must be forwarded to the remote processor for evaluation regardless of the transaction amount.

5. A system as recited in claim 1 wherein said transaction card includes a magnetic stripe.

6. A system as recited in claim 5 wherein the risk assessment information is encoded onto said magnetic stripe.

7. A system as recited in claim I further including a data control center connected between said terminal means and said first processor means.

8. A system as recited in claim 7 wherein said data control center includes an intermediate processor means and evaluation parameters supplied by the issuer, such that the data control center will only forward the transaction information to the remote processor means if the transaction does not fall within the parameters maintained at the data control center.

* * * * *